United States Patent
Suetsugu

(10) Patent No.: US 12,328,408 B2
(45) Date of Patent: Jun. 10, 2025

(54) VOICE CONVERSATION APPARATUS

(71) Applicant: Katsunori Suetsugu, Tokyo (JP)

(72) Inventor: Katsunori Suetsugu, Tokyo (JP)

( * ) Notice: Subject to any disclaimer, the term of this patent is extended or adjusted under 35 U.S.C. 154(b) by 454 days.

(21) Appl. No.: 17/934,255

(22) Filed: Sep. 22, 2022

(65) Prior Publication Data

US 2023/0117434 A1 Apr. 20, 2023

(30) Foreign Application Priority Data

Aug. 16, 2021 (JP) .................. 2021-132114

(51) Int. Cl.
| | |
|---|---|
| *H04M 1/60* | (2006.01) |
| *H04W 4/16* | (2009.01) |
| *H04W 4/80* | (2018.01) |

(52) U.S. Cl.
CPC .......... *H04M 1/6066* (2013.01); *H04W 4/16* (2013.01); *H04W 4/80* (2018.02)

(58) Field of Classification Search
CPC ........ H04M 1/6066; H04W 4/80; H04W 4/16
See application file for complete search history.

(56) References Cited

U.S. PATENT DOCUMENTS

| | | | | |
|---|---|---|---|---|
| 2018/0070291 A1* | 3/2018 | Breaux | ................. | H04W 4/027 |
| 2020/0037074 A1* | 1/2020 | Röck | ........................ | H04R 5/04 |

FOREIGN PATENT DOCUMENTS

| | | |
|---|---|---|
| JP | 2004-120495 A | 4/2004 |
| JP | 2006-333122 A | 12/2006 |

* cited by examiner

*Primary Examiner* — David Bilodeau
(74) *Attorney, Agent, or Firm* — MASUVALLEY & PARTNERS; Peter Martinez

(57) ABSTRACT

A voice conversation apparatus includes a microphone configured to convert a voice of the one speaking person into a voice signal, modulation means configured to modulate the voice signal into a signal using ultrasound as a carrier wave, sound wave emission means configured to emit the signal modulated by the modulation means as a sound wave using ultrasound as a carrier wave, alignment means used by the one speaking person to make alignment so that the sound wave emission means is oriented to another voice conversation apparatus, pairing means configured to perform a pairing process of connecting the voice conversation apparatus to the other voice conversation apparatus by near-field communication, and control means configured to receive an instruction to start a conversation from the one speaking person and to, when the pairing process is successful, cause the sound wave emission means to emit the sound wave.

25 Claims, 8 Drawing Sheets

VOICE CONVERSATION APPARATUS

CROSS-REFERENCE TO RELATED APPLICATION

This application claims priority to Japanese Patent Application No. 2021-132114 filed on Aug. 16, 2021, which is hereby incorporated herein by reference in its entirety.

TECHNICAL FIELD

The present invention relates to a voice conversation apparatus.

BACKGROUND ART

A portable loudspeaker is known that is held by a speaking person and used to have a conversation with a listener and includes a microphone that converts a voice into a voice signal, an amplifier that amplifies the voice signal obtained by the microphone, a drive unit that converts the voice signal amplified by the amplifier into a voice, and a speaker unit including an ear pad that is closely contacted with an auricle of the listener for use and prevents leakage of the amplified voice to the outside (Japanese Unexamined Patent Application Publication No. 2004-120495).

Also, a loudspeaker system is known that includes voice reproduction means that are recording a voice signal, modulation means that modulates the voice signal outputted from the voice reproduction means into a signal using ultrasound as a carrier wave, a super directional speaker that emits a voice using ultrasound as a carrier wave on the basis of the signal generated by the modulation means, multiple sensors that detect users who listen to the voice, a support base that changes the orientation of the super directional speaker, and control means that causes the voice reproduction means to output a voice signal in accordance with detection signals of the sensors and controls the support base to change the orientation of the super directional speaker (Japanese Unexamined Patent Application Publication No. 2006-333122).

See Japanese Unexamined Patent Application Publication Nos. 2004-120495 and 2006-333122.

SUMMARY OF INVENTION

An object of the present invention is to provide a voice conversation apparatus that allows a speaking person to have a conversation with a particular conversation partner in a not quiet environment or from a somewhat distant place while suppressing leakage of the voice to the surroundings.

To solve the above problem, a voice conversation apparatus of a first aspect of the present invention is a voice conversation apparatus used by one speaking person to have a conversation with one or more other speaking persons distant from the one speaking person bidirectionally. The voice conversation apparatus includes a microphone configured to convert a voice of the one speaking person into a voice signal, modulation means configured to modulate the voice signal into a signal using ultrasound as a carrier wave, sound wave emission means configured to emit the signal modulated by the modulation means as a sound wave using ultrasound as a carrier wave, alignment means used by the one speaking person to make alignment so that the sound wave emission means is oriented to another voice conversation apparatus, pairing means configured to perform a pairing process of connecting the voice conversation apparatus to the other voice conversation apparatus by near-field communication, and control means configured to receive an instruction to start a conversation from the one speaking person and to, when the pairing process is successful, cause the sound wave emission means to emit the sound wave.

According to a second aspect of the present invention, in the voice conversation apparatus of the first aspect of the present invention, the control means may cause the sound wave emission means to sequentially emit the sound wave to multiple other voice conversation apparatuses while shifting time.

According to a third aspect of the present invention, in the voice conversation apparatus of the first aspect of the present invention, when the pairing process is unsuccessful, the control means may cause the sound wave emission means to emit the sound wave to the other voice conversation apparatus when it is confirmed that the sound wave emission means has been oriented to the other voice conversation apparatus using the alignment means.

According to a fourth aspect of the present invention, in the voice conversation apparatus of any one of the first to third aspects of the present invention, the alignment means may include a peephole disposed on a near side in a sound wave emission direction of the sound wave emission means and a mark embedded in the peephole, and the one speaking person may make alignment so that the sound wave emission means is oriented to the other voice conversation apparatus by aligning the mark with the other voice conversation apparatus.

According to a fifth aspect of the present invention, in the voice conversation apparatus of any one of the first to third aspects of the present invention, the alignment means may be a light-emitting device that emits visible light from the voice conversation apparatus to the other voice conversation apparatus, and the one speaking person may make alignment by emitting the visible light to the other voice conversation apparatus.

According to a sixth aspect of the present invention, the voice conversation apparatus of any one of the first to fifth aspects of the present invention may further include a mounting portion for mounting the voice conversation apparatus on a divider for isolating the one speaking person from the one or more other speaking persons.

According to a seventh aspect of the present invention, in the voice conversation apparatus of the sixth aspect of the present invention, the divider may be a partition for isolating the one speaking person from the opposite one or more other speaking persons.

According to an eighth aspect of the present invention, in the voice conversation apparatus of the sixth aspect of the present invention, the divider may be a transparent face guard for covering at least a part of a face of the one speaking person.

According to a ninth aspect of the present invention, in the voice conversation apparatus of the sixth aspect of the present invention, the divider may be a mask for covering a mouth and a nose of the one speaking person.

According to a tenth aspect of the present invention, the voice conversation apparatus of any one of the first to fifth aspects of the present invention may further include a mounting portion for mounting the voice conversation apparatus on a body of the one speaking person.

According to an eleventh aspect of the present invention, in the voice conversation apparatus of the tenth aspect of the present invention, the mounting portion may include a strap for hanging the voice conversation apparatus on a neck of the one speaking person.

According to a twelfth aspect of the present invention, in the voice conversation apparatus of the tenth aspect of the present invention, the mounting portion may include an ear hook for hanging the voice conversation apparatus on an ear of the one speaking person.

According to a thirteenth aspect of the present invention, in the voice conversation apparatus of the tenth aspect of the present invention, the mounting portion may include a band for hanging the voice conversation apparatus on a head of the one speaking person.

According to the first aspect of the present invention, the speaking person is able to have a conversation with the conversation partner in a not quiet environment or from a somewhat distant place while suppressing leakage of the voice to the surroundings.

According to the second aspect of the present invention, the speaking person is able to have a conversation with multiple conversation partners distant from the speaking person while shifting time.

According to the third aspect of the present invention, the speaking person is able to reliably have a conversation with the conversation partner distant from the speaking person.

According to the fourth and fifth aspects of the present invention, the speaking person is able to align the sound wave emission means with the other voice conversation apparatus of the conversation partner.

According to the sixth aspect of the present invention, the speaking person is able to easily mount the voice conversation apparatus on the divider for isolating the speaking person.

According to the seventh aspect of the present invention, the speaking person is able to have a conversation with the conversation partner over the partition for isolating the speaking person.

According to the eighth aspect of the present invention, the speaking person is able to clearly have a conversation with the conversation partner over the face guard.

According to the ninth aspect of the present invention, the speaking person is able to clearly have a conversation with the conversation partner over the mask.

According to the tenth to thirteenth aspects of the present invention, the speaking person is able to use the voice conversation apparatus in a hands-free manner.

DESCRIPTION OF EMBODIMENTS

Figure 1:
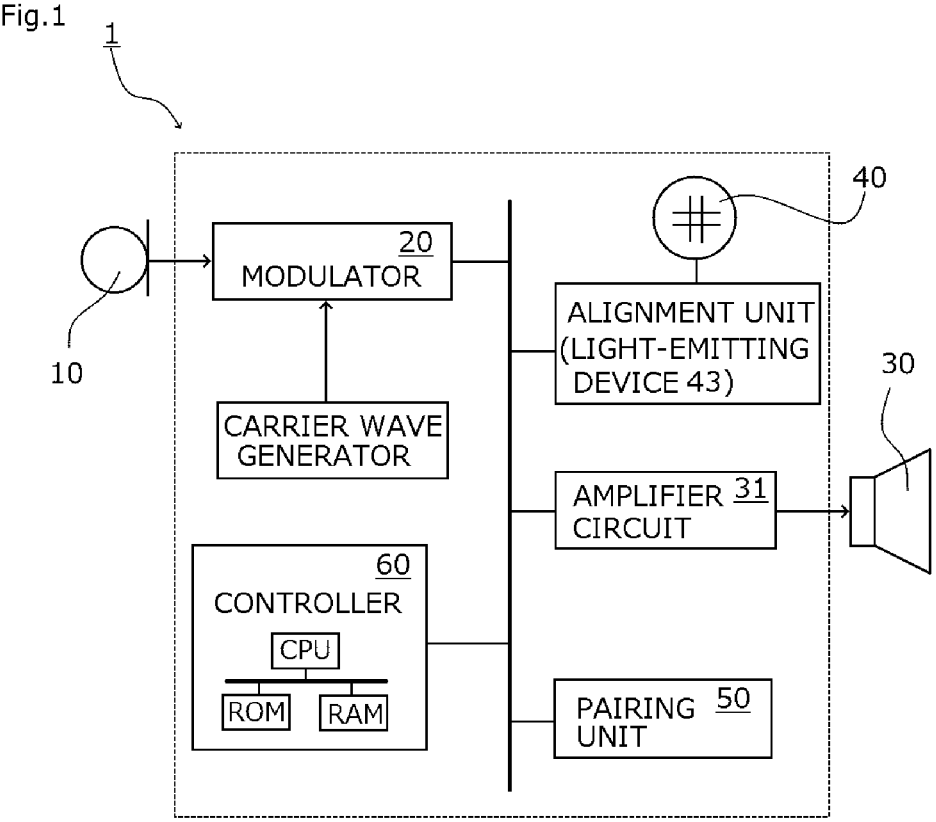
FIG. 1 a block diagram showing an example block configuration of a voice conversation apparatus according to an embodiment.

Referring now to the drawings, an embodiment and specific examples of the present invention will be described in detail. However, the present invention is not limited to the embodiment or specific examples. Also, the drawings are schematic, and elements other than those required for the description are omitted therein as appropriate in order to clarify the description.

(1) Configuration and Operation of Voice Conversation Apparatus

FIG. 1 a block diagram showing an example block configuration of a voice conversation apparatus 1 according to the present embodiment. FIG. 2 is a schematic drawing showing an example configuration of an ultrasonic speaker 30. FIG. 3 is an external perspective view of the voice conversation apparatus 1 showing an example configuration of an alignment unit 40. The voice conversation apparatus 1 according to the present embodiment will be described below with reference to the drawings.

As shown in FIG. 1, the voice conversation apparatus 1 includes a microphone 10 that converts the voice (a sound wave having an audible frequency) of a speaking person into a voice signal, a modulator 20 that modulates the voice signal obtained by the microphone 10 into a signal using ultrasound as a carrier wave, an ultrasonic speaker 30 serving as an example of sound wave emission means that emits the voice signal modulated by the modulator 20 as a sound wave using ultrasound as a carrier wave, an alignment unit 40 serving as an example of alignment means for making alignment so that the ultrasonic speaker 30 is oriented to another voice conversation apparatus 1, a pairing unit 50 that performs a pairing process of pairing the voice conversation apparatus 1 with the other voice conversation apparatus 1 by near-field communication, and a controller 60 that receives an instruction to start a conversation from the speaking person and, when the pairing process is successful, causes the ultrasonic speaker 30 to emit the sound wave.

The microphone 10 is a converter that is located in a position reached by the voice of the speaking person and converts the voice (a sound wave having an audible frequency) of the speaking person into a voice signal. The voice signal collected by the microphone 10 is transmitted to the conversation partner through the ultrasonic speaker 30. Note that the microphone 10 is not limited to a particular type of microphone such as dynamic microphone or condenser microphone as long as it is able to collect the voice of the frequency of the speaking person. While the microphone 10 is not required to have particular directivity, it is preferably able to actively collect the voice around the mouth of the speaking person.

The ultrasonic speaker 30 is an ultrasonic generator that generates ultrasound using an amplifier circuit 31 that amplifies the modulation signal modulated by the modulator 20 that modulates the voice signal of the speaking person into an ultrasonic frequency (a frequency of 20 kHz or more).

The ultrasonic speaker 30 converts the drive signal from the amplifier circuit 31 into air vibration having a higher frequency (e.g., 20 kHz or more) than the audible frequency range of a human. The ultrasonic speaker 30 is not limited to a particular structure, type, or the like. A specific example of the ultrasonic speaker 30 is one in which multiple ultrasonic vibrators 32 for outputting ultrasound are collectively arranged in an array, for example, in a matrix and that is disposed such that the ultrasound emission direction is oriented to the head (specifically, around the ears) of the conversation partner holding the other voice conversation apparatus 1.

Figure 2A:
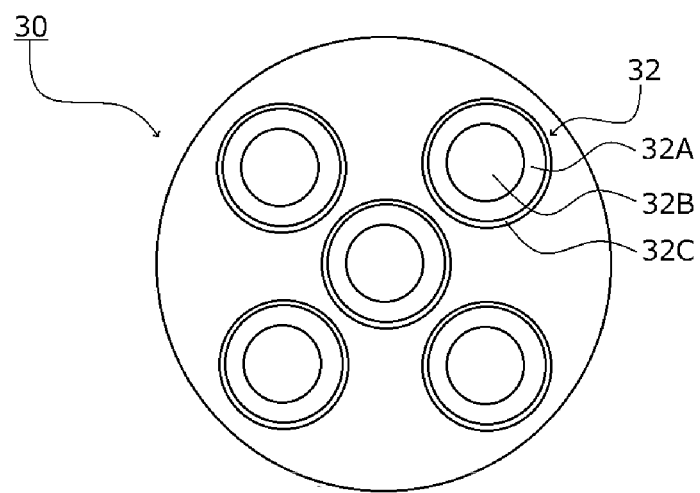
FIGS. 2A and 2B are schematic drawings showing an example configuration of an ultrasonic speaker.
Figure 2B:
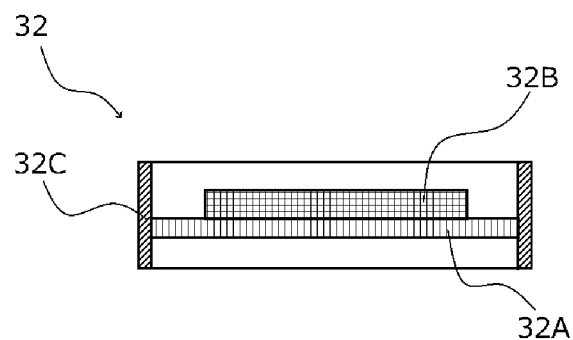

As shown in FIGS. 2A and 2B, each ultrasonic vibrator 32 includes a sheet-shaped vibration member 32A and a piezoelectric vibrator 32B whose entire surface is fixed to one surface of the vibration member 32A using an adhesive and is restrained by the vibration member 32A, and the edge of the vibration member 32A is supported by a frame 32C. The vibration member 32A may be made of any material such as a metal or resin as long as the material has a high modulus of elasticity with respect to the piezoelectric vibrator 32B, which is made of a brittle material. Preferably, the vibration member 32A is made of phosphor bronze, stainless steel, or the like in terms of workability or cost. The vibration member 32A vibrates on the basis of the vibration of the piezoelectric vibrator 32B and emits a sound wave having a frequency of, for example, 20 kHz or more. The piezoelectric vibrator 32B also emits a sound wave having a frequency of, for example, 20 kHz or the like due to its own vibration.

The ultrasonic speaker 30 thus configured emits the ultrasound having an ultrasonic frequency (a frequency of 20 kHz or more) obtained by modulating the voice signal of the speaking person, toward the head of the conversation partner. The ultrasound emitted is self-demodulated into the voice of the speaking person having the audible frequency (a sound wave having an audible frequency) on the conversation partner side (around the head or ears). As seen above, the ultrasonic speaker 30 is able transmit the voice of the speaking person to the conversation partner with high directivity while suppressing leakage of the voice to the surroundings.

Figure 3A:
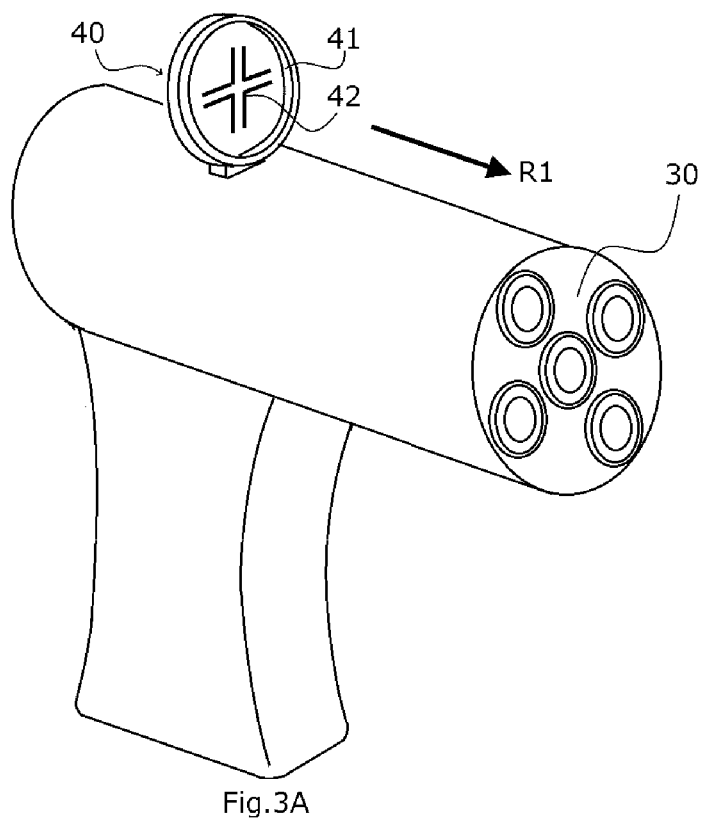
FIGS. 3A and 3B are external perspective views of the voice conversation apparatus showing an example configuration of an alignment unit.

As shown in FIG. 3A, the alignment unit 40 includes a peephole 41 disposed on the near side in the sound wave emission direction of the ultrasonic speaker 30 (see an arrow R1 in FIG. 3A) and a mark 42 embedded in the peephole 41. The speaking person makes alignment so that the ultrasonic speaker 30 of the voice conversation apparatus 1 is oriented to the conversation partner holding the other voice conversation apparatus 1 by aligning the mark 42 with the other voice conversation apparatus 1.

The peephole 41 is a through hole in which the mark 42 for making alignment is embedded. The mark 42 only has to be a mark that allows the speaking person to easily make alignment, such as a cross, a point, two or more lines, an arrow, or a scale printed or inscribed on a transparent plate material. The mark 42 may be formed in black, or may be formed in a color other than black, such as red, so as to be easily recognized. While the peephole 41 is circular in FIG. 3A, it may have any shape such as a polygon or ellipse or any size as long as the speaking person is able to sufficiently visually recognize therethrough the other voice conversation apparatus 1 to be aligned with.

Modification

Figure 3B:
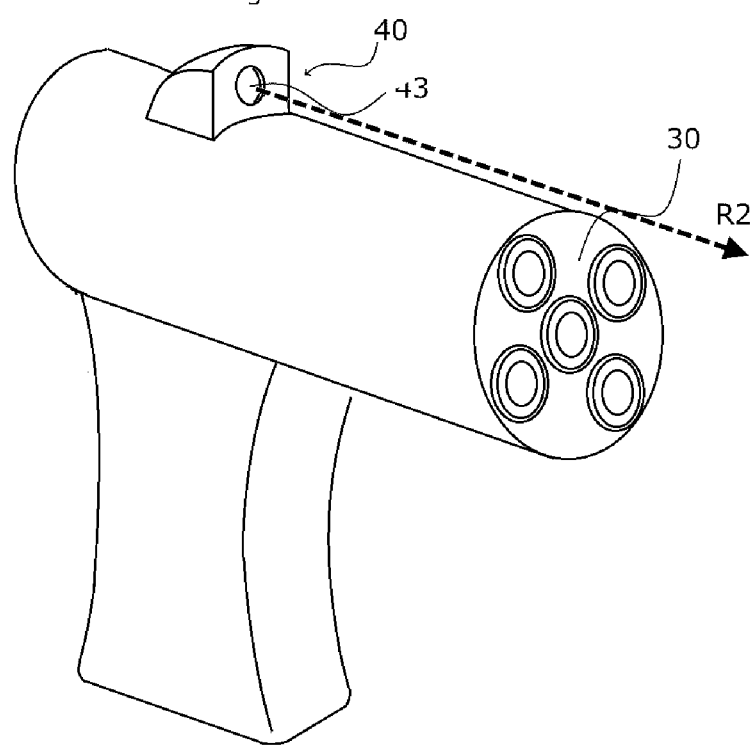

As shown in FIG. 3B, the alignment unit 40 may consist of a light-emitting device 43 that emits visible light from the voice conversation apparatus 1 toward the other voice conversation apparatus 1. The light-emitting device 43 may be of any type as long as it is a device that emits visible light, and is, for example, a light-emitting diode (LED) having a light-emitting wavelength in a visible light band. The speaking person may make alignment so that the ultrasonic speaker 30 of the voice conversation apparatus 1 is oriented to the conversation partner holding the other voice conversation apparatus 1 by emitting visible light from the alignment unit 40 of the voice conversation apparatus 1 toward the other voice conversation apparatus 1 (see an arrow R2 in FIG. 3B) and checking the position of the conversation partner.

The voice conversation apparatus 1 according to the present embodiment allows the speaking person to make alignment so that the ultrasonic speaker 30 of the voice conversation apparatus 1 is oriented to the conversation partner holding the other voice conversation apparatus 1 using the alignment unit 40 and to reliably transmit the voice of the speaking person to the conversation partner located in a somewhat distant place using the ultrasonic speaker 30 having high directivity.

In the present embodiment, the voice conversation apparatus 1 and the other voice conversation apparatus 1 are able to communicate with each other by near-field communication, for example, by near-field communication according to the Bluetooth® standard. Near-field communication according to the Bluetooth® standard allows apparatuses distant from each other by several meters or so to communicate with each other. For example, if the voice conversation apparatus 1 of the speaking person and the other voice conversation apparatus 1 of the conversation partner are able to communicate with each other by near-field communication properly, it can be determined that the other voice conversation apparatus 1 of the conversation partner is located within a radius of several meters or less from the voice conversation apparatus 1 of the speaking person.

The pairing unit 50 associates the voice conversation apparatus 1 of the speaking person and the other voice conversation apparatus 1 of the conversation partner with each other. The pairing unit 50 updates pairing information on the basis of pairing registration data sequentially transmitted from the other voice conversation apparatus 1 of the conversation partner. Specifically, when the voice conversation apparatus 1 of the speaking person is able to transmit or receive data to and from the associated other voice conversation apparatus 1 of the conversation partner by near-field communication, the pairing unit 50 generates pairing registration data and transmits it to the controller 60. On the other hand, when the voice conversation apparatus 1 of the speaking person is not able to transmit or receive data to and from the associated other voice conversation apparatus 1 of the conversation partner by near-field communication, the pairing unit 50 does not transmit pairing registration data. As seen above, the pairing unit 50 manages the presence/absence of the other voice conversation apparatus 1 of the conversation partner by updating and managing the pairing information.

More specifically, when pairing registration data is transmitted from the other voice conversation apparatus 1 of the conversation partner whose "pairing information" is "OFF," the pairing unit 50 sets the "pairing information" to "ON." The pairing unit 50 keeps the "pairing information" at "ON" as long as pairing registration data is transmitted at predetermined timings. The other voice conversation apparatus 1 of the conversation partner whose "pairing information" is set to "ON" as described above is referred to as an apparatus paired (or in a paired state) with the associated voice conversation apparatus 1 of the speaking person.

On the other hand, when pairing registration data has not been transmitted from the other voice conversation apparatus 1 of the conversation partner whose "pairing information" is "ON" for a predetermined time or more, the pairing unit 50 sets the pairing information to OFF. The pairing unit 50 keeps the "pairing information" in an "OFF" state until pairing registration data is transmitted. The other voice conversation apparatus 1 of the conversation partner whose "pairing information" is set to "OFF" as described above is referred to as an apparatus not paired (or in an unpaired state) with the associated voice conversation apparatus 1 of the speaking person.

The controller 60 is a microprocessor including a central processing unit (CPU), a read-only memory (ROM), a random access memory (RAM), a non-volatile memory, and the like. The controller 60 controls emission of the ultrasonic speaker 30 of the voice conversation apparatus 1 using the pairing information of the pairing unit 50. Specifically, when the controller 60 receives an instruction to start a conversation from the speaking person, acquires the pairing information of the pairing unit 50, and determines that the voice conversation apparatus 1 is in a paired state with the other voice conversation apparatus 1 of the conversation partner, it drives the ultrasonic speaker 30 to transmit the voice signal collected by the microphone 10 to the conversation partner. If pairing has yet to be established, the speaking person uses the alignment unit 40 to make alignment so that the ultrasonic speaker 30 of the voice conversation apparatus 1 is oriented to the conversation partner holding the other voice conversation apparatus 1 and makes an instruction to start a conversation. In response, the controller 60 drives the ultrasonic speaker 30 of the voice conversation apparatus 1 to transmit the voice signal collected by the microphone 10 to the conversation partner. Thus, the speaking person is able to reliably have a conversation with the conversation partner distant from the speaking person.

The controller 60 also controls display on the display unit 13 of the other voice conversation apparatus 1 of the conversation partner paired with the voice conversation apparatus 1. For example, when the voice conversation apparatus 1 and the other voice conversation apparatus 1 of the conversation partner are in a paired state, the controller 60 turns on a light-emitting diode (LED); when they are not in a paired state, it turns off the LED.

When the voice conversation apparatus 1 and other voice conversation apparatuses 1 of multiple conversation partners are paired, the controller 60 sequentially switches among the other voice conversation apparatuses 1 of the conversation partners in a paired state, drives the ultrasonic speaker 30 of the voice conversation apparatus 1 to transmit the voice signal to each conversation partner. Specifically, the controller 60 maintains a paired state only with the other voice conversation apparatus 1 of the conversation partner that the speaking person is scheduled to have a conversation with next among the other voice conversation apparatuses 1 of the conversation partners in a paired state and transmits the voice signal to the other voice conversation apparatus 1 of the conversation partner in a paired state. Thus, the speaking person is able to have a conversation with the conversation partners distant from the speaking person while shifting the time.

As seen above, the controller 60 preferentially transmits the voice signal to the voice conversation apparatus 1 of the conversation partner in a paired state by collaborating with the pairing unit 50. That is, responsive to the voice conversation apparatus 1 receiving an instruction to start a conversation from the speaking person, the controller 60 acquires the pairing information from the pairing unit 50, determines whether the voice conversation apparatus 1 and the other voice conversation apparatus 1 of the conversation partner are in a paired state, if it determines that they are in a paired state, turns on the display units of the voice conversation apparatus 1 and the other voice conversation apparatus 1, and drives the ultrasonic speaker 30 of the voice conversation apparatus 1 to transmit the voice signal collected by the microphone 10 to the conversation partner.

If the controller 60 determines that they are not in a paired state, it keeps the display units of the voice conversation apparatus 1 and the other voice conversation apparatus 1 off and waits for an instruction to start a conversation from the speaking person. At this time, for example, the speaking person uses the alignment unit 40 to make alignment so that the ultrasonic speaker 30 of the voice conversation apparatus 1 is oriented to the conversation partner holding the other voice conversation apparatus 1 and makes an instruction to start a conversation. In response, the controller 60 drives the ultrasonic speaker 30 of the voice conversation apparatus 1 to transmit the voice signal collected by the microphone 10 to the conversation partner.

Example 1

Figure 4A:
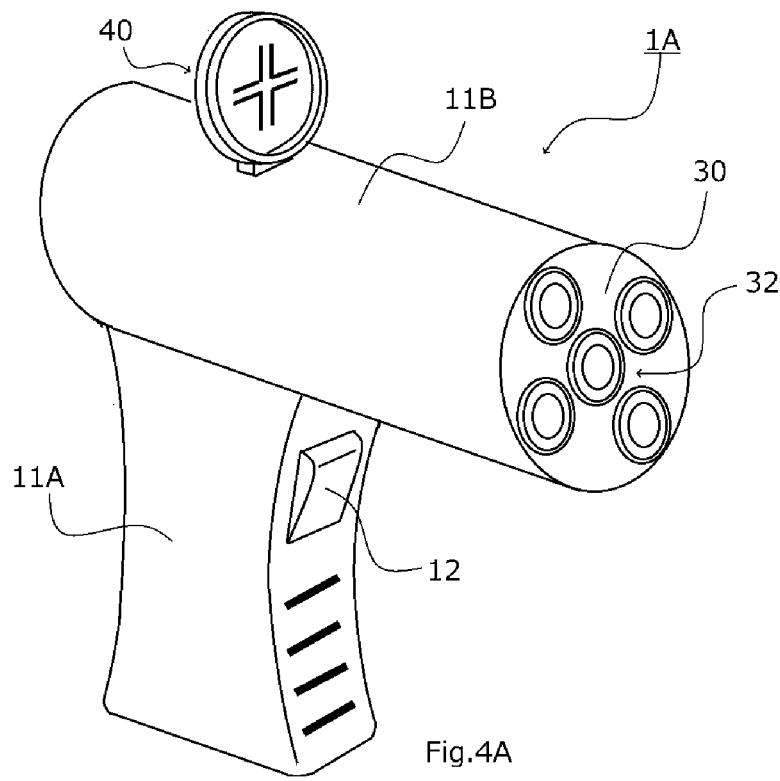
FIGS. 4A and 4B are perspective views showing an example of the external shape of a voice conversation apparatus according to Example 1.
Figure 4B:
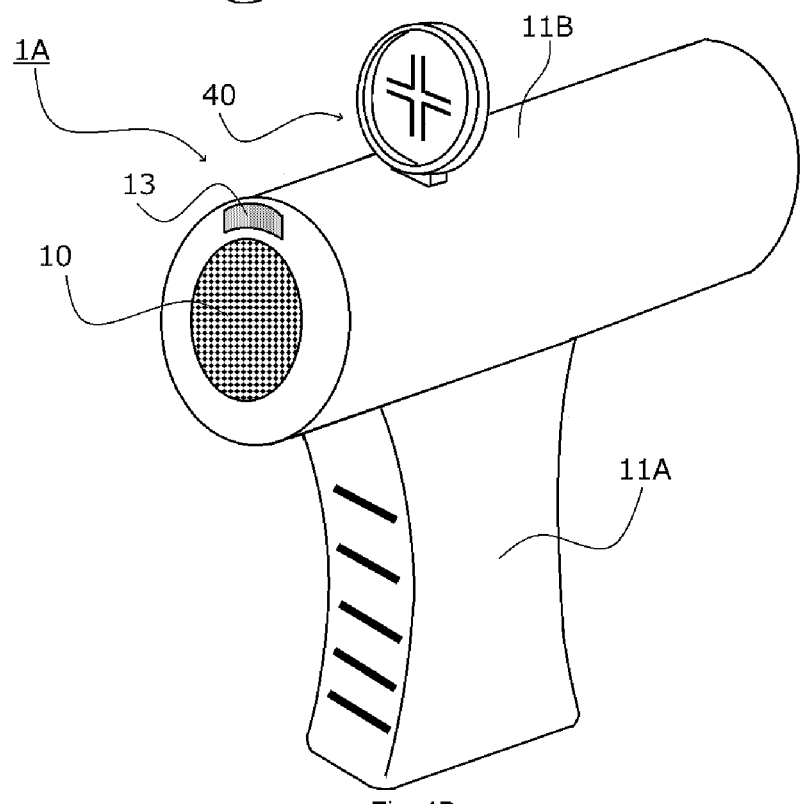

FIGS. 4A and 4B are perspective views showing an example of the external shape of a voice conversation apparatus 1A according to Example 1. The voice conversation apparatus 1A includes a body 11, an ultrasonic speaker 30 mounted on the tip of the body 11, and an alignment unit 40 disposed on the near side in the sound wave emission direction of the ultrasonic speaker 30 on an upper portion of the body 11. The voice conversation apparatus 1A has a size and weight such that the speaking person is able to hold the entire apparatus with one hand.

The body 11 includes a grip 11A to be grasped by a hand of the speaking person and a speaker unit 11B connected to the grip 11A and extending forward. The grip 11A houses a substrate (not shown) having a controller 60, a pairing unit 50, a modulator 20, and the like mounted thereon and a power supply unit (not shown) that consists of a battery or rechargeable battery and supplies operating power to the substrate, ultrasonic speaker 30, and the like. The grip 11A is provided with a switch 12 used by the speaking person to issue an instruction to start a conversation. When the speaking person pushes the switch 12, the controller 60 receives an instruction to start a conversation.

A microphone 10 that converts the voice of the speaking person into a voice signal is disposed on the near side (speaking person side) of the speaker unit 11B. Also, a display unit 13 that displays a paired state is disposed on the near side of the speaker unit 11B. The ultrasonic speaker 30 is disposed on the tip of the speaker unit 11B such that ultrasonic vibrators 32 are oriented outward. The alignment unit 40 is disposed between the microphone 10 and ultrasonic speaker 30 on an upper portion of the speaker unit 11B.

When speaking persons somewhat distant from each other hold the voice conversation apparatuses 1A thus configured, each speaking person is able to have a conversation with a particular conversation partner while suppressing leakage of the voice to the surroundings. In particular, even in a not quiet environment, the speaking person is able to transmit the voice to the conversation partner without having to use a loudspeaker, megaphone, or the like or without having to make a large voice. Also, the pairing unit 50 checks whether the voice conversation apparatus 1A of the speaking person is in a paired state with the other voice conversation apparatus 1A of the conversation partner. This allows the speaking person to select one or more conversation partners and to have a conversation with the selected conversation partner(s).

Example 2

Figure 5:
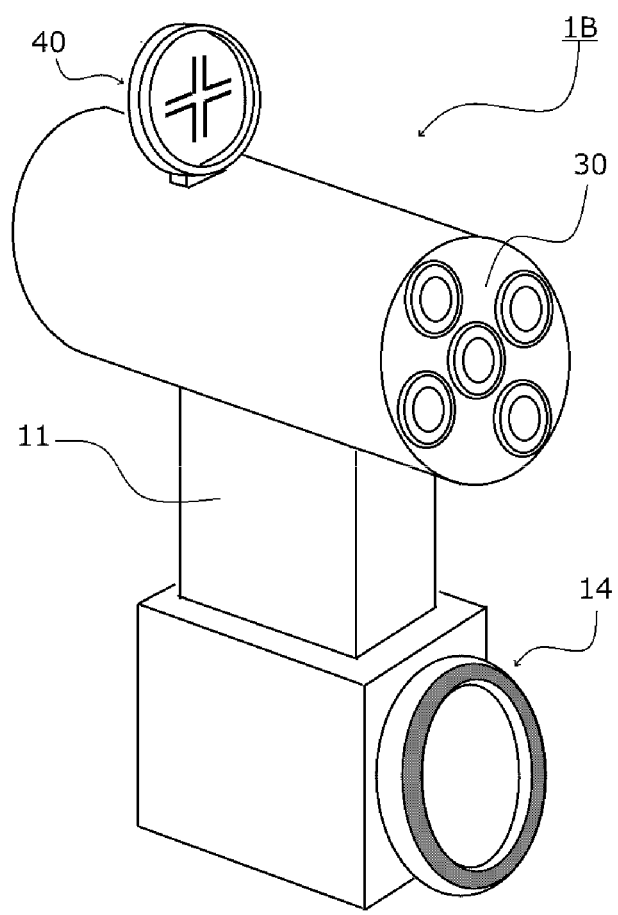
FIG. 5 is a perspective view showing an example of the external shape of a voice conversation apparatus according to Example 2.

FIG. 5 is a perspective view showing an example of the external shape of a voice conversation apparatus 1B according to Example 2. The voice conversation apparatus 1B includes a body 11, an ultrasonic speaker 30 mounted on the tip of the body 11, a microphone 10 that is mounted on the near side opposite to the ultrasonic speaker 30 of the body 11 and converts the voice of the speaking person into a voice signal, an alignment unit 40 mounted on the near side in the sound wave emission direction of the ultrasonic speaker 30 on an upper portion of the body 11, and a mounting portion 14 for mounting the voice conversation apparatus 1B on a divider for isolating the speaking person from other speaking persons. When the voice conversation apparatus 1B is mounted on the divider, the speaking person is allowed to have a conversation with the other speaking persons.

The body 11 houses a substrate (not shown) having a controller 60, a pairing unit 50, a modulator 20, and the like mounted thereon and a power supply unit (not shown) that consists of a battery or rechargeable battery and supplies operating power to the substrate, ultrasonic speaker 30, and the like. The body 11 is provided with a switch 12 used by the speaking person to issue an instruction to start a conversation. When the speaking person pushes the switch 12, the controller 60 receives an instruction to start a conversation.

The body 11 is also provided with the mounting portion 14 for mounting the voice conversation apparatus 1B on the divider. The mounting portion 14 is configured to be able to fix the voice conversation apparatus 1B to the divider in accordance with the specific aspect of the divider. If the divider is an acrylic plate or glass plate as an example of a partition for isolating opposite speaking persons from each other, the mounting portion 14 is, for example, a sucker mechanism whose internal state can be switched between a vacuum state and a non-vacuum state. Note that the mounting portion 14 is not limited to the sucker mechanism and may be one of a double-sided tape mechanism, a hook mechanism, and a clamp mechanism. Also, the voice conversation apparatus 1B may be formed so as to be light and small, and such a voice conversation apparatus may be mounted on a transparent face guard for covering at least a part of the face of the speaking person serving as a divider using a sucker mechanism and then used. If the divider is a mask for covering the mouth and nose of the speaking person, the voice conversation apparatus may be temporarily bonded to the surface of the mask using an adhesive and then used.

Example 3

FIGS. 6A to 8B are perspective views showing examples of the external shape of voice conversation apparatuses 1C according to Example 3. Each voice conversation apparatus 1C includes a body 11, an ultrasonic speaker 30 mounted on the front side of the body 11, a microphone 10 that is disposed toward the mouth of the speaking person and converts the voice of the speaking person into a voice signal, and a mounting portion 15 for mounting the voice conversation apparatus 1C on the body of the speaking person. When the voice conversation apparatus 1C is mounted on the body of the speaking person, the speaking person is allowed to have a conversation with other speaking persons in a hands-free manner.

The mounting portion 15 is a mechanism for mounting the voice conversation apparatus 1C on the body of the speaking person. In the present embodiment, a strap 15A to be hung on the neck of the speaking person, an ear hook 15B to be hung on an ear of the speaking person, and a band 15C to be hung on the head of the speaking person are described as examples of the mounting portion 15. As seen above, the speaking person mounts each voice conversation apparatus 1C on their body using the mounting portion 15 and then uses it. Thus, the speaking person is able to align the ultrasonic speaker 30 with the conversation partner without having to use the alignment unit 40 by orienting themself toward the conversation partner.

Figure 6A:
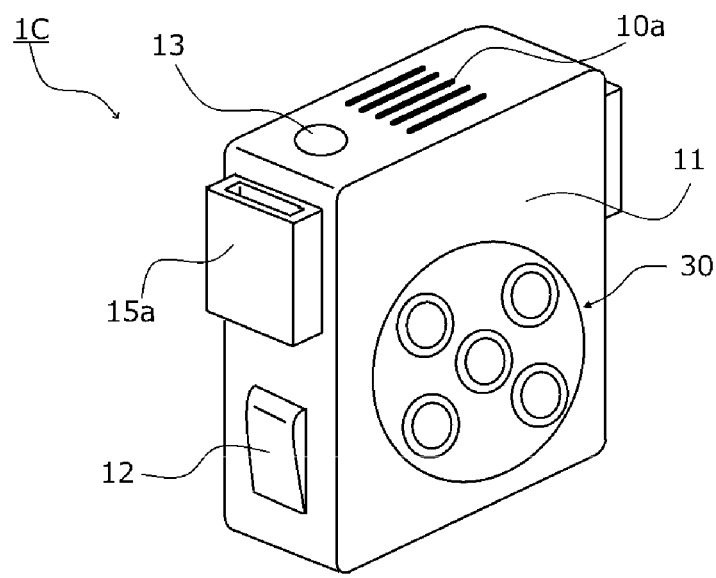
FIG. 6A is an external perspective view showing an example of a voice conversation apparatus according to Example 3 including a strap holder into which a strap is to be inserted and FIG. 6B is a drawing showing the mounted state of the voice conversation apparatus according to Example 3 including the strap.
Figure 6B:
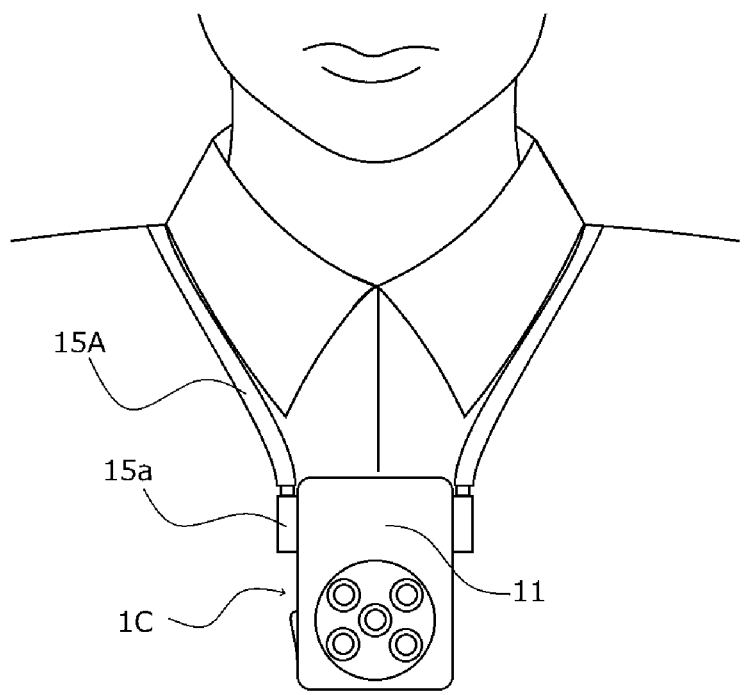

FIG. 6A shows an example of the external shape of a voice conversation apparatus 1C including a strap holder 15a into which the strap 15A is to be inserted. FIG. 6B shows the mounted state of the voice conversation apparatus 1C including the strap 15A. In this voice conversation apparatus 1C, the ultrasonic speaker 30 is disposed on the front surface of the body 11. The sound collector 10a of the microphone 10 and a paired state check lamp (LED) serving as a display unit 13 are disposed on the upper surface of the body 11. A switch 12 used by the speaking person to issue an instruction to start a conversation is disposed on a side surface of the body 11. The strap holder 15a into which the strap 15A is to be inserted is disposed on an upper portion of the side surface of the body 11 so that the voice conversation apparatus 1C can be carried. The speaking person is able to use the voice conversation apparatus 1C in a hands-free manner by hanging it on the neck using the strap 15A.

Figure 7A:
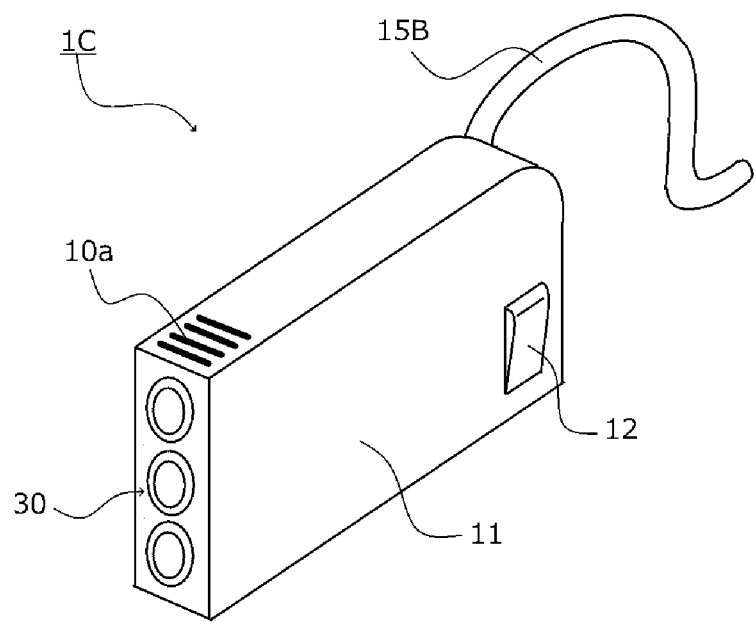
FIG. 7A is an external perspective view showing an example of a voice conversation apparatus according to Example 3 including an ear hook and FIG. 7B is a drawing showing the mounted state of the voice conversation apparatus according to Example 3 including the ear hook.
Figure 7B:
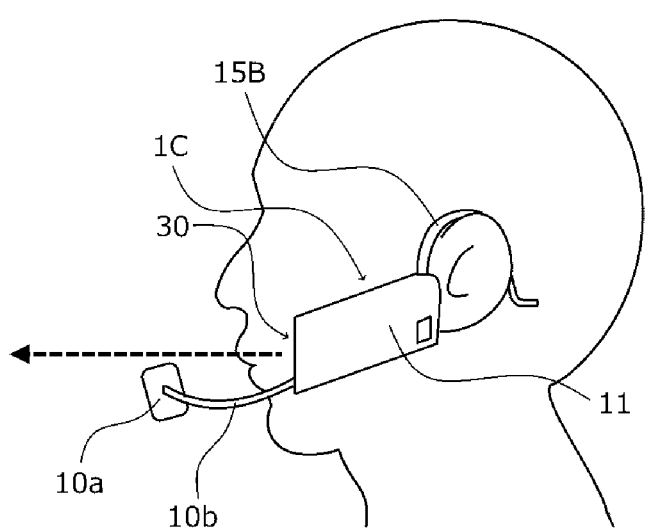

FIG. 7A shows an example of the external shape of a voice conversation apparatus 1C including the ear hook 15B. FIG. 6B shows the mounted state of the voice conversation apparatus 1C including the ear hook 15B. When the speaking person mounts the voice conversation apparatus 1C on the left ear or right ear using the ear hook 15B, the ultrasonic speaker 30 disposed on the front surface of the body 11 serving as an outer surface is oriented in the forward direction of the speaking person (see an arrow in FIG. 7B). A switch 12 used by the speaking person to issue an instruction to start a conversation is disposed on a side surface of the body 11. The sound collector 10a of the microphone 10 is disposed near the tip of the body 11. As shown in FIG. 7B, the sound collector 10a of the microphone 10 may be mounted to the body 11 through a microphone arm 10b so as to be oriented toward around the mouth of the speaking person. As seen above, the speaking person is able to use the voice conversation apparatus 1C in a hands-free manner by hanging it on the ear using the ear hook 15B.

Figure 8A:
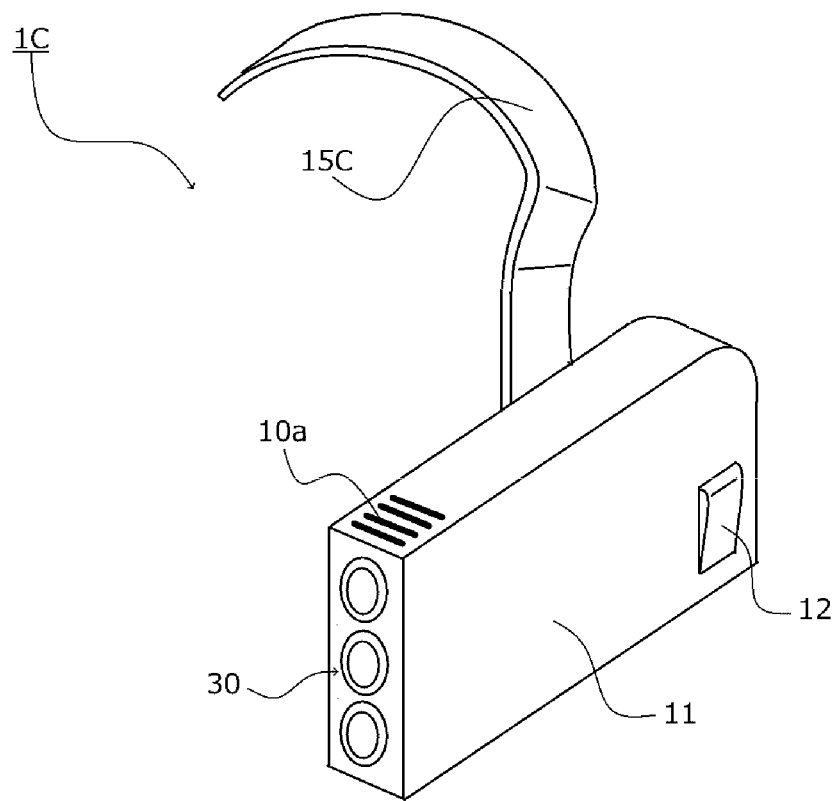
FIG. 8A is an external perspective view showing an example of a voice conversation apparatus according to Example 3 including a band and FIG. 8B is a drawing showing the mounted state of the voice conversation apparatus according to Example 3 including the band.
Figure 8B:
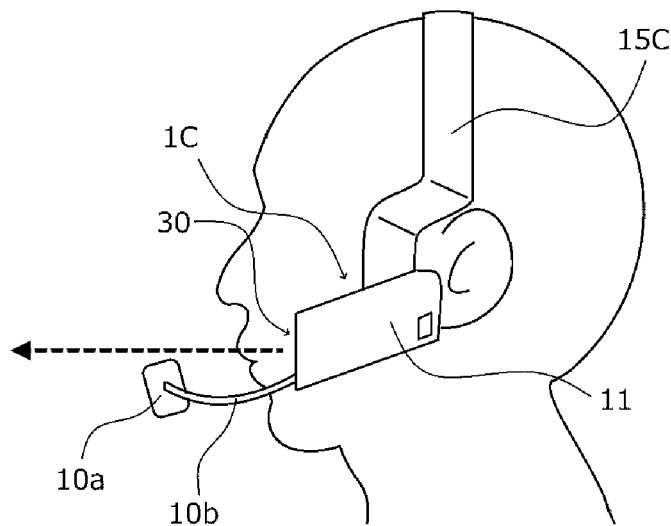

FIG. 8A shows an example of the external shape of a voice conversation apparatus 1C including the band 15C. FIG. 8B shows the mounted state of the voice conversation apparatus 1C including the band 15C. When the speaking person mounts the voice conversation apparatus 1C on the head using the band 15C, the ultrasonic speaker 30 disposed on the front surface of the body 11 serving as an outer surface is oriented in the forward direction of the speaking person (see an arrow in FIG. 8B). The sound collector 10a of the microphone 10 is disposed near the tip of the body 11. As shown in FIG. 8B, the sound collector 10a of the microphone 10 may be mounted to the body 11 through a microphone arm 10*b* so as to be oriented toward around the mouth of the speaking person. A switch 12 used by the speaking person to issue an instruction to start a conversation is disposed on a side surface of the body 11. As seen above, the speaking person is able to use the voice conversation apparatus 1C in a hands-free manner by hanging it on the head using the band 15C.

The voice conversation apparatus 1C according to Example 3 is mounted to the body of the speaking person through the mounting portion 15. Thus, the speaking person is able to have a conversation with the conversation partner in a hands-free manner by making a voice toward the conversation partner. Note that the conversation partner may mount the voice conversation apparatus 1C including the mounting portion 15 on their body or may hold the handheld voice conversation apparatus 1A according to Example 1.

(3) Functions of Voice Conversation Apparatus

The voice conversation apparatus 1 according to the present embodiment converts the voice of the speaking person collected by the microphone 10 into a voice signal, modulates the voice signal into a signal using ultrasound as a carrier wave in the modulator 20, and emits the modulated signal from the ultrasonic speaker 30 as a sound wave using ultrasound as a carrier wave. The ultrasound emitted is self-demodulated into the voice of the speaking person having an audible frequency (a sound wave having an audible frequency) on the conversation partner side. Thus, the speaking person is able to have a conversation with the particular conversation partner in a not quiet environment or from a somewhat distant place while suppressing leakage of the voice to the surroundings.

The voice conversation apparatus 1 allows the speaking person to make alignment so that the ultrasonic speaker 30 is oriented to the conversation partner holding the other voice conversation apparatus 1 using the alignment unit 40 and to reliably transmit the voice to the conversation partner located in a somewhat distant place using the ultrasonic speaker 30 having high directivity.

The voice conversation apparatus 1 controls emission of the ultrasonic speaker 30 using the pairing information of the pairing unit 50. Thus, the speaking person is able to reliably have a conversation with the conversation partner distant from the speaking person. When the voice conversation apparatus 1 is paired with other voice conversation apparatuses 1 of multiple conversation partners, the speaking person is able to sequentially select one of the conversation partners and to have a conversation with the selected conversation partner by sequentially switching among the other voice conversation apparatuses 1 of the conversation partners in a paired state, driving the ultrasonic speaker 30 of the voice conversation apparatus 1, and transmitting the voice signal to each conversation partner.

DENOTATION OF REFERENCE NUMERALS

1,1A,1B,1C: voice conversation apparatus
10: microphone
20: modulator
30: ultrasonic speaker
31: amplifier circuit
32: ultrasonic vibrator
40: alignment unit
41: peephole
42: mark:

43: light-emitting device
50: pairing unit
60: controller

What is claimed is:

1. A voice conversation apparatus used by one speaking person to have a conversation with one or more other speaking persons distant from the one speaking person bidirectionally, comprising:
   a microphone configured to convert a voice of the one speaking person into a voice signal;
   modulation means configured to modulate the voice signal into a signal using ultrasound as a carrier wave;
   sound wave emission means configured to emit the signal modulated by the modulation means as a sound wave using ultrasound as a carrier wave;
   alignment means used by the one speaking person to make alignment so that the sound wave emission means is oriented to another voice conversation apparatus;
   pairing means configured to perform a pairing process of connecting the voice conversation apparatus to the other voice conversation apparatus by near-field communication; and
   control means configured to receive an instruction to start a conversation from the one speaking person and to, when the pairing process is successful, cause the sound wave emission means to emit the sound wave.

2. The voice conversation apparatus according to claim 1, wherein the control means causes the sound wave emission means to sequentially emit the sound wave to a plurality of other voice conversation apparatuses while shifting time.

3. The voice conversation apparatus according to claim 1, wherein when the pairing process is unsuccessful, the control means causes the sound wave emission means to emit the sound wave to the other voice conversation apparatus when it is confirmed that the sound wave emission means has been oriented to the other voice conversation apparatus using the alignment means.

4. The voice conversation apparatus according to claim 1,
   wherein the alignment means comprises a peephole disposed on a near side in a sound wave emission direction of the sound wave emission means and a mark embedded in the peephole, and
   wherein the one speaking person makes alignment so that the sound wave emission means is oriented to the other voice conversation apparatus by aligning the mark with the other voice conversation apparatus.

5. The voice conversation apparatus according to claim 1,
   wherein the alignment means is a light-emitting device that emits visible light from the voice conversation apparatus to the other voice conversation apparatus, and
   wherein the one speaking person makes alignment by emitting the visible light to the other voice conversation apparatus.

6. The voice conversation apparatus according to claim 1, further comprising a mounting portion for mounting the voice conversation apparatus on a divider for isolating the one speaking person from the one or more other speaking persons.

7. The voice conversation apparatus according to claim 6, wherein the divider is a partition for isolating the one speaking person from the opposite one or more other speaking persons.

8. The voice conversation apparatus according to claim 6, wherein the divider is a transparent face guard for covering at least a part of a face of the one speaking person.

9. The voice conversation apparatus according to claim 6, wherein the divider is a mask for covering a mouth and a nose of the one speaking person.

10. The voice conversation apparatus according to claim 1, comprising a mounting portion for mounting the voice conversation apparatus on a body of the one speaking person.

11. The voice conversation apparatus according to claim 10, wherein the mounting portion comprises a strap for hanging the voice conversation apparatus on a neck of the one speaking person.

12. The voice conversation apparatus according to claim 10, wherein the mounting portion comprises an ear hook for hanging the voice conversation apparatus on an ear of the one speaking person.

13. The voice conversation apparatus according to claim 10, wherein the mounting portion comprises a band for hanging the voice conversation apparatus on a head of the one speaking person.

14. The voice conversation apparatus according to claim 2,
wherein the alignment means comprises a peephole disposed on a near side in a sound wave emission direction of the sound wave emission means and a mark embedded in the peephole, and
wherein the one speaking person makes alignment so that the sound wave emission means is oriented to the other voice conversation apparatus by aligning the mark with the other voice conversation apparatus.

15. The voice conversation apparatus according to claim 3,
wherein the alignment means comprises a peephole disposed on a near side in a sound wave emission direction of the sound wave emission means and a mark embedded in the peephole, and
wherein the one speaking person makes alignment so that the sound wave emission means is oriented to the other voice conversation apparatus by aligning the mark with the other voice conversation apparatus.

16. The voice conversation apparatus according to claim 2,
wherein the alignment means is a light-emitting device that emits visible light from the voice conversation apparatus to the other voice conversation apparatus, and
wherein the one speaking person makes alignment by emitting the visible light to the other voice conversation apparatus.

17. The voice conversation apparatus according to claim 3,
wherein the alignment means is a light-emitting device that emits visible light from the voice conversation apparatus to the other voice conversation apparatus, and
wherein the one speaking person makes alignment by emitting the visible light to the other voice conversation apparatus.

18. The voice conversation apparatus according to claim 2, further comprising a mounting portion for mounting the voice conversation apparatus on a divider for isolating the one speaking person from the one or more other speaking persons.

19. The voice conversation apparatus according to claim 3, further comprising a mounting portion for mounting the voice conversation apparatus on a divider for isolating the one speaking person from the one or more other speaking persons.

20. The voice conversation apparatus according to claim 4, further comprising a mounting portion for mounting the voice conversation apparatus on a divider for isolating the one speaking person from the one or more other speaking persons.

21. The voice conversation apparatus according to claim 5, further comprising a mounting portion for mounting the voice conversation apparatus on a divider for isolating the one speaking person from the one or more other speaking persons.

22. The voice conversation apparatus according to claim 2, comprising a mounting portion for mounting the voice conversation apparatus on a body of the one speaking person.

23. The voice conversation apparatus according to claim 3, comprising a mounting portion for mounting the voice conversation apparatus on a body of the one speaking person.

24. The voice conversation apparatus according to claim 4, comprising a mounting portion for mounting the voice conversation apparatus on a body of the one speaking person.

25. The voice conversation apparatus according to claim 5, comprising a mounting portion for mounting the voice conversation apparatus on a body of the one speaking person.

* * * * *